Feb. 3, 1931.　　　S. L. VAN METER, JR　　　1,791,152
STORAGE BATTERY
Filed Dec. 29, 1925　　　2 Sheets-Sheet 1

INVENTOR
SOLOMON L. VAN METER JR.
BY
ATTORNEY

Feb. 3, 1931. S. L. VAN METER, JR 1,791,152
STORAGE BATTERY
Filed Dec. 29, 1925 2 Sheets-Sheet 2
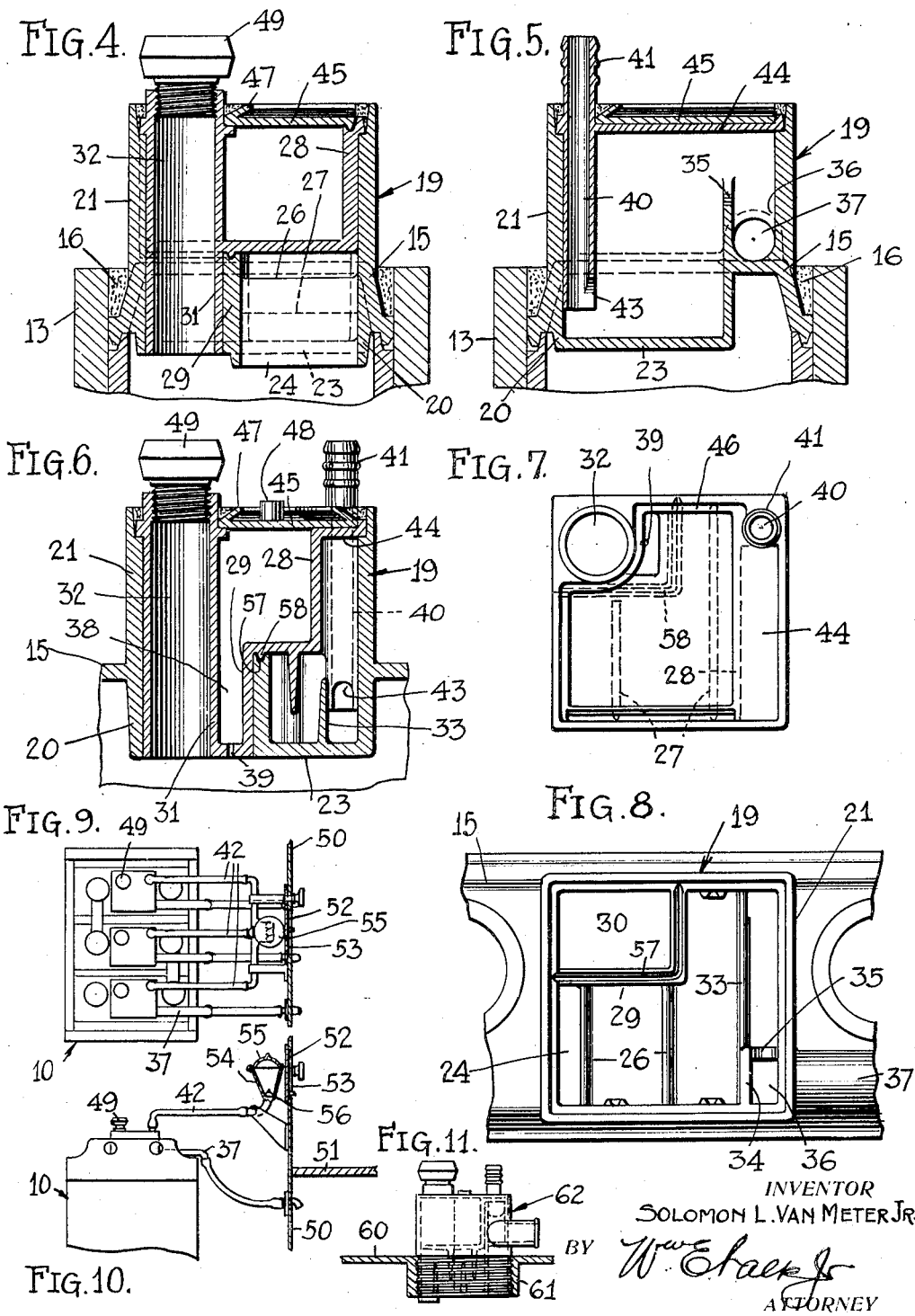

Patented Feb. 3, 1931

1,791,152

UNITED STATES PATENT OFFICE

SOLOMON L. VAN METER, JR., OF GARDEN CITY, NEW YORK

STORAGE BATTERY

Application filed December 29, 1925. Serial No. 78,072.

My invention relates to storage batteries.

In automobiles, aeroplanes and other enclosed body structures having storage batteries contained therein, it is necessary, in servicing the battery, to remove a section of the body covering, reach in from an awkward position, and unscrew or otherwise remove the battery filler plug or plugs, and thereafter, pour in, from the same awkward position, the distilled water required to be added to the battery cell or cells. It is also necessary, in thus servicing a battery, to avoid an overflow or the use of an excess amount of distilled water, as otherwise an improper proportioning of the electrolyte ingredients, to the detriment of the battery, will result.

The main object of my invention is to provide simple, reliable and relatively inexpensive means for discharging a liquid, such as distilled water, into the several cells of a storage battery, so as to bring the electrolyte to a predetermined level in each of the cells. A further object of the invention is to provide a filling device of this character which will act automatically to shut off the discharge of liquid into the cell when the electrolyte reaches said predetermined level, and, further, to indicate when this level has been reached and the flow of water into the cell cut off so that the operator may stop pouring water into the device.

A further object of the invention is to provide a filling device of this character, including an air vent for the cell, located at such a level that it will be sealed, so that the trapped air will shut off the flow of liquid into the cell, when the electrolyte reaches the proper level, thus causing the liquid in the filling passage to back up and overflow, affording a visible indication of the fact that the cell has been filled to the proper limit.

A further object of the invention is to provide a filling device of this character which is so constructed as to practically prevent the diffusion of the electrolyte thru any liquid which may remain in the filling device after the cell has been filled to the proper level.

Other objects and advantages of the invention will be hereinafter more fully described.

In the drawings, wherein like reference characters denote like or corresponding parts, Fig. 1 is a plan view of a multiple cell storage battery constructed according to the present invention;

Fig. 4 is a transverse sectional view, on the line 4—4 of Fig. 2;

Fig. 5 is a similar view, on the line 5—5 of Fig. 2;

Fig. 6 is a sectional view on the line 6—6 of Fig. 2;

Fig. 7 is a plan view of that part of one of the enclosing walls of the battery cell having the collecting chamber formed in it;

Fig. 8 is a plan view of one of the battery cells and with the part illustrated in Fig. 7 removed;

Fig. 9 is a diagrammatic illustration showing the relation of a multiple cell storage battery to an enclosing structure such as an automobile;

Fig. 10 is a further diagrammatic illustration, viewed from a different angle of the structure illustrated in Fig. 9, and Fig. 11 is an elevation of a modification.

Figure 1:
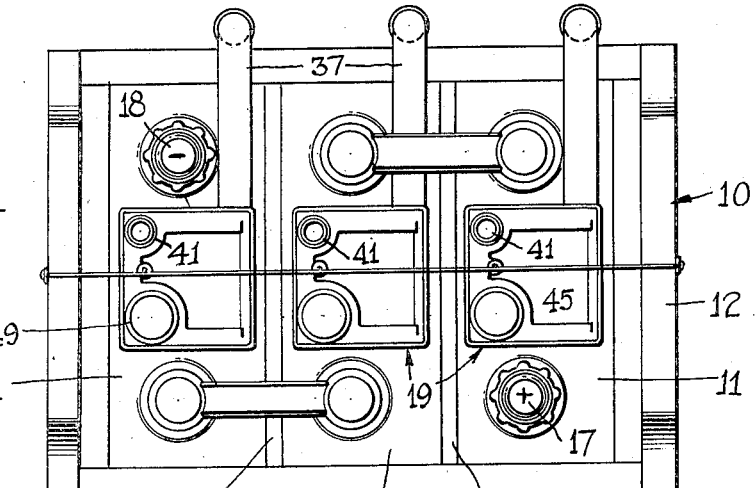
Figure 2:
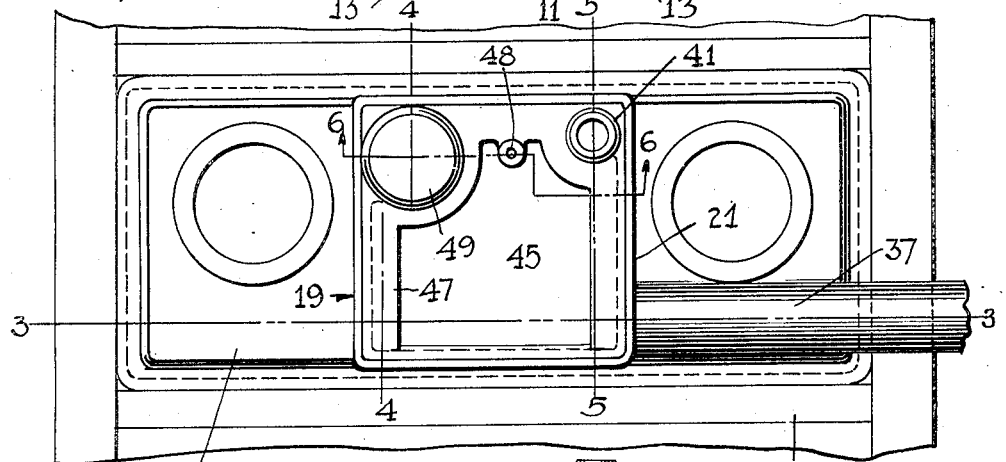
Fig. 2 is a plan view, somewhat enlarged, of one of the battery cells.

In general, I accomplish the objects of my invention by providing for each of the several cells of the storage battery, a filling device which includes a filler passage discharging into the cell and connected at its opposite end to an inlet duct, thru which the distilled water or other liquid may be discharged into the filler passage, and thence into the cell. An outlet or overflow duct is also provided, which communicates with the filler passage so that when the liquid backs up in said passage to a predetermined level, it will flow out thru the overflow duct. Preferably, the inlet duct discharges into the filler passage below the overflow level, so that none of the liquid will flow out of the overflow duct until it is backed up in the filler passage to the overflow level. In order to shut off the discharge of the liquid into the cell thru the filling device, when the electrolyte in the cell reaches a predetermined level, I provide an air vent for the cell and locate it so that it will be sealed by the electrolyte when the latter reaches the predetermined level, thus imprisoning or entrapping air in the cell above the electrolyte, the pressure of which prevents further discharge of any substantial amount of liquid into the cell until the level of the electrolyte has dropped sufficiently to unseal the vent. This vent, therefore, acts like a valve, automatically shutting off the discharge of liquid into the cell when the electrolyte reaches the proper level.

Refering to the numbered parts of the drawing in which I have illustrated one embodiment of my invention, I have shown a storage battery 10 having three individual cells 11. These cells are encased in a suitable box 12, and separated by partition walls 13, and each cell is adapted to contain an electrolyte and appropriate electrodes 14, in accordance with the usual practice. I have provided for each cell a top wall 15 of special construction, in which the filling device is incorporated. This top wall is sealed in position, closing the cell, by cement 16. The usual positive and negative terminals 17 and 18, respectively, are provided, together with the usual electrical connections between the several battery cells.

As stated above, the top wall 15 of the cell has incorporated therein the improved filling device. This device includes a filler passage 25 having a discharge opening 24 thru which the liquid to be added flows into the cell. An inlet duct 40 communicates with said passage and has a nipple 41 at its upper end to which a rubber tube 42 may be connected, leading off from a suitably located funnel-shaped mouth 54 into which the distilled water or the liquid may be poured. The inlet duct 40 extends into the filler passage 25 and discharges into it at a point near the bottom thereof. If desired, the side of the tube 40 can be cut away, as at 43, to increase its outlet area. An overflow duct 37 is also provided, which leads from a well 36, separated from the filler passage by a baffle 35, so that any liquid backing up in the filler passage to the level of the baffle will overflow into the well 36 and run off thru the duct 37.

The cell is sealed to the air except for a vent 39 (see Fig. 6), which is located at substantially the level of the discharge opening 24 so that it will be sealed when the electrolyte in the cell reaches the proper level. The vent 39 is formed in the lower end of a collecting chamber 28, and another vent 48 is provided in the upper wall of this collecting chamber. As the cell is being filled, the air above the electrolyte can escape thru the vent 39, collecting chamber 28, and vent 48, until the cell has been filled to the proper level, when the vent 39 will be sealed, imprisoning or entrapping air above the electrolyte in the cell and setting up a back pressure which is effective to cut off the flow of liquid thru the discharge opening 24. Consequently, as more liquid is poured in thru the inlet duct 40, it will back up in the filler passage 25 until it spills over the baffle 35 into the well 36 and runs off thru the duct 37, thus indicating that the cell has been filled to the proper level and no more liquid should be added. A quantitiy of liquid will remain in the filler passage and in the collecting chamber 28 since the overflow thru the duct 37 will stop as soon as the level of the liquid drops below the top edge of the baffle 35. Baffles 26 and 27 are provided in the filler passage 25, making it a tortuous passage, in order to retard the diffusion of the electrolyte thru any liquid remaining in the filler passage.

Figure 3:
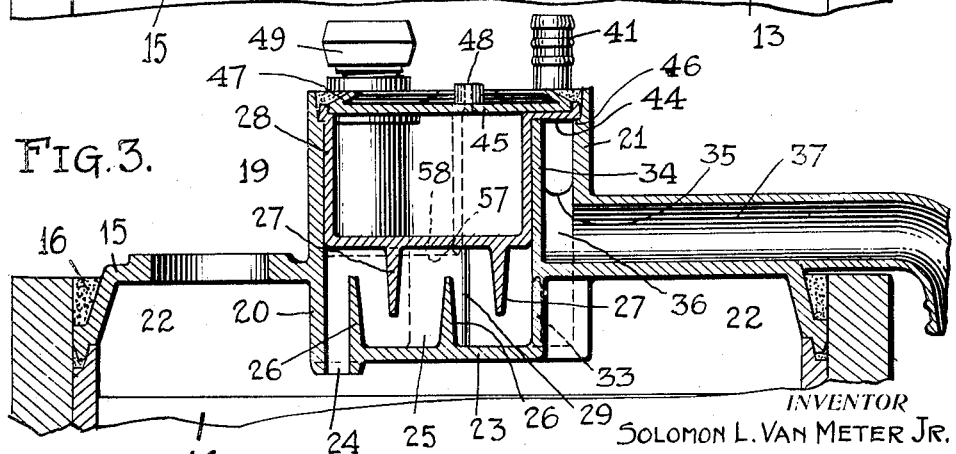
Fig. 3 is a longitudinal sectional view, on the line 3—3 of Fig. 2.

I have incorporated this filler passage in the top wall 15 of the cell by providing the top wall with an integral enlargement or housing 19 having a bottom wall 23 at substantially the electrolyte level, and side walls 20 and 21. The discharge opening 24 is formed in the bottom wall 23 (see Figs. 3 and 4), and this bottom wall also carries the integral upwardly extending baffles 26 as well as a baffle 33, as shown in Figs. 3 and 8. Adjacent one side of the housing 19 the baffle 33 terminates in an upwardly extending wall 34 which, with the side wall 21, defines, in one corner of the housing the well 36 from which the overflow pipe 37 leads to a point of discharge at one side of the battery.

A right-angled partition wall 29 also extends upwardly from the bottom wall 23 of the housing 19 (see Figs. 4 and 8). The chamber 28 rests upon this partition wall and is provided with flanges at its upper edge which seat upon shoulders formed in the upper part of said housing. The wall of the chamber 28, therefore, cooperates with the housing 19 and the partition wall 29 to form the tortuous filler passage. The baffles 27 in said passage are carried by and depend from the lower wall of the chamber 28, as shown in Figs. 3 and 6. Moreover, a cylindrical tube or well 32 is formed integrally with the wall of the chamber 28, as shown in Figs. 4 and 6, thru which an instrument may be inserted to test the condition of the cell, and the upper end of this tube may be closed by a removable screw cap or plug 49. The chamber 28 also has an overhanging flange 44 (see Figs. 5 and 6), and the inlet duct 40 is formed integrally with this overhanging flange and depends therefrom into the filler passage. The upper end of the chamber 28 is closed by a top plate 45, which seats upon the ledge 44 and upon shoulders 46 provided at the top of the side wall of the chamber 28, and said top or cover plate preferably has an inclined flange 47 which cooperates with the upper portion of the housing 19 to form a pocket into which the liquid cement for sealing the cover plate is adapted to be poured. The cover 45 also carries the air vent 48 communicating with the chamber 28 so that vent 39, chamber 28, and vent 48 together constitute an air vent passage thru which air may escape from the cell as liquid is poured thereinto and the level of the electrolyte rises. The lower end of this vent passage is sealed when the electrolyte reaches the proper level and closes the vent 39.

In Figs. 9 and 10, I have illustrated, more or less diagrammatically, the application of my filling devices to the storage battery of an automobile. 50 denotes the usual skirt or apron provided, just above the running board 51 of an automobile. The storage battery 10 is carried on the automobile chassis and is concealed behind this apron. I may support, behind an opening 52, formed in the apron, the substantially funnel-shaped mouth 54 previously mentioned, which said mouth, if desired, may be provided with a hinged lid or cover 55. A removable closure 53, may, if desired, be provided for the opening 52. From the funnel 54 run the rubber tubes 42, one of which is connected to each of the inlet ducts 40. If desired, each inlet duct may have associated with it, within the funnel 54, an individual cover plate or lid 56, whereby communication between the funnel in any one or more of the tubes 42 may be cut off, should occasion demand. Preferably, tho not necessarily, the overflow passages 37 are extended thru the skirt 50 to a point at which the discharge therefrom may be readily observed.

In servicing a storage battery equipped with my invention, there are a number of advantages. One can pour distilled water into the funnel 54, from which it flows thru the tubes 42 into the several filler passages for the cells. This water will be discharged into the cells until the electrolyte in each cell reaches the proper level and seals the lower end of the vent, thus automatically cutting off the flow of liquid to that cell. As soon as this happens, the water entering the filler passage 25 backs up until it reaches the level of the top of the baffle 35, flows over the baffle, and is discharged thru the overflow duct or passage 37. When water begins to run out of the overflow duct 37, one knows that the particular cell with which that overflow is associated has been filled to the proper level. Of course, some liquid will flow into the chamber 28 thru the air vent 39 but, since the vent 39 is of relatively small size compared with the inlet duct 40, water enters the filler passage much more rapidly than it can escape thru the vent 39, and hence, backs up in the filler passage quickly and is discharged thru the overflow duct 37. The chamber 28 constitutes an enlargement of the air vent passage and collects the liquid forced thru the small vent 39 after it has been sealed, thus preventing overflow by way of the vent passage.

The modification of Fig. 11 illustrates the same idea embodied in a somewhat different structure. Instead of enlarging the top cell wall as in the preferred arrangement, said wall 60 has formed in it an annular interiorly threaded depending flange 61 into which a plug 62 is screwed. Said plug is so formed and constructed as to embrace within its defining walls all of the structure described in connection with the preferred arrangement as embodied within the enlargement 19 thereof. Its function and operation otherwise is identical. A storage battery of this modified type is advantageous in that the conventional type battery may be characterized as herein set forth by replacing the ordinary plugs such as 62.

Where the vent is referred to in the claims as being open to the outside atmosphere, it is intended that such expression shall be interpreted to include either a direct or indirect venting of the battery cell to the outside air.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. The combination with a storage battery cell containing an electrolytic compound, of a passage for a filling liquid discharging into said cell, an overflow duct communicating with the filler passage, and a vent for said cell so located as to be sealed by the electrolyte when it reaches a predetermined level, thereby shutting off the discharge of liquid from the filler passage into said cell and causing the liquid to back up in the filler passage and to run off thru said overflow duct, said vent being open to the outside atmosphere.

2. The combination with a storage battery cell containing an electrolytic compound, of a passage for a filling liquid discharging into said cell, an inlet duct communicating with said filler passage, an overflow duct also communicating with said filler passage, and means for automatically stopping the discharge of liquid from said filler passage to the cell when the electrolyte in the cell reaches a predetermined level comprising a vent for said cell adapted to be sealed by the electrolyte when it reaches said level, said vent, at one end, being open to the outside atmosphere.

3. The combination with a storage battery cell containing an electrolytic compound, of a passage for a filling liquid discharging into said cell, an inlet duct communicating with said filler passage, an outlet duct also communicating with said filler passage, and a vent for said cell open at one end to the outside atmosphere, said vent being relatively small as compared to said inlet duct and being located as to be sealed by the filling liquid within said cell when it reaches a predetermined level.

4. The combination with a storage battery cell containing an electrolytic compound, a passage for a filling liquid extending into said cell, an inlet duct communicating with said filler passage, an overflow duct communicating with said filler passage, an obstruction in said filler passage interposed between the discharge end of the inlet duct and the intake end of the overflow duct, and a vent for said cell located so as to be sealed by the liquid in said cell when it reaches a predetermined level.

5. The combination with a storage battery cell containing an electrolytic compound, of a filling device for said cell including a passage for a filling liquid discharging thereinto, an inlet duct communicating with said filler passage, an overflow duct also communicating with said filler passage, and a vent passage thru which air may escape from the cell to the outside atmosphere as the level of the electrolyte rises upon the discharge of liquid from said filler passage into said cell, the lower end of said vent passage being located at the normal electrolyte level whereby the electrolyte will seal said vent passage when it reaches said level to cut off automatically the discharge of further liquid from said filler passage into the cell.

6. The combination with a storage battery cell containing an electrolytic compound, of a filling device for said cell including a passage for a filling liquid discharging thereinto as well as an inlet and an overflow duct communicating with said filler passage, and an air vent passage connecting said cell with the outer air and having its lower end located at the predetermined level at which the cell is to be filled with electrolyte.

7. The combination with a storage battery cell containing an electrolytic compound, of means for filling said cell with liquid to a predetermined level comprising a filler passage for said fluid discharging into said cell, and an inlet duct and an outlet duct each communicating with said filler passage, and a vent connecting the interior of said cell with the outer air and located so as to be sealed by the electrolyte when it reaches said predetermined level.

8. The combination with a storage battery cell containing an electrolytic compound, of a filler passage thru which a filling liquid may be discharged into said cell, an inlet duct communicating with said filler passage, a vent connecting the interior of said cell with the outer air and adapted to be sealed by the electrolyte within the cell when it reaches a predetermined level to stop automatically the discharge of liquid from said filler passage, and an overflow duct communicating with said filler passage thru which liquid overflows when caused to back up in said filler passage by the sealing of said vent.

9. The combination with a storage battery cell containing an electrolytic compound, of an open filler circuit including an inlet duct, a passage for a filling liquid and an overflow duct, said overflow duct being open at one end to said filler passage and being open at its opposite end to the outside air and said filler passage being unobstructed from its inlet to its outlet end and at its outlet end being carried into said cell to discharge thereinto, and a vent for said cell so located as to be sealed by the electrolyte when it reaches a predetermined level thereby shutting off the discharge of liquid from said filler passage into said cell and causing liquid to back up within said passage and to run off thru said overflow duct as a visible indication of the fact that a further liquid supply is superfluous.

10. The combination with a storage battery cell containing an electrolytic compound, of a passage for a filling liquid discharging into said cell, an overflow duct communicating with said filler passage, and a vent for said cell so located as to be sealed by the electrolyte when it reaches a predetermined level thereby shutting off the discharge of liquid from the filler passage into said cell and causing liquid to back up in said filler passage and to run off thru said overflow duct, said cell, except for said vent, being airtight at the moment the electrolyte reaches its proper level.

11. The combination with a storage battery cell, containing an electrolytic compound, of an open filler circuit including an inlet duct, a passage for a filling liquid and an overflow duct, said overflow duct being open at one end to said filler passage and being open at its opposite end to the outside air, and said filler passage being unobstructed from its inlet to its outlet end and at its outlet end being carried into said cell to a point of discharge at the proper level of the electrolyte whereby, in a filling operation, the filling liquid upon reaching said proper electrolyte level, is adapted to back up within said filler passage until the level of said overflow duct is reached, at which point, and by means of said overflow duct, all excess filling liquid is carried off to the outside air as a visible indication of the fact that a further liquid supply is superfluous.

12. The combination with a storage battery cell, of a filler circuit open at one end to the outside air and including an inlet duct, a passage for a filling liquid, and an overflow duct, said filler duct being arranged to empty into said filler passage, said filler passage being arranged to empty into said cell and being unobstructed from its inlet to its outlet end whereby in a filling operation, the filling liquid, after said cell shall have been filled to its proper level, is adapted to back up therein until the level of the overflow duct is reached, and said overflow duct being arranged to liberate to the outside air at a point of visibility all excess filling liquid entering thru said inlet duct.

13. The combination with a storage battery cell, of an open filler circuit including an inlet duct, a passage for a filling liquid, and an overflow duct, said overflow duct and said inlet duct being open to said filler passage at points in out-of-alignment relation and said overflow duct at its outlet end being open to the outside air to carry off all excess filling liquid, and said filler passage being arranged to discharge into said cell and being unobstructed from its inlet to its outlet end whereby, in a filling operation, the filling liquid directed thereinto from said inlet duct is adapted, after said cell shall have been filled to its proper level, to back up within said filler passage until the level of said overflow duct is reached.

In testimony whereof I hereunto affix my signature.

SOLOMON L. VAN METER, Jr.